Feb. 10, 1970

W. H. BAUER 3,494,513

POSITIVE EXPULSION TANK

Filed Aug. 11, 1966

INVENTOR.
WILLIAM H. BAUER

BY

Bean, Brooks, Buckley & Bean
ATTORNEYS

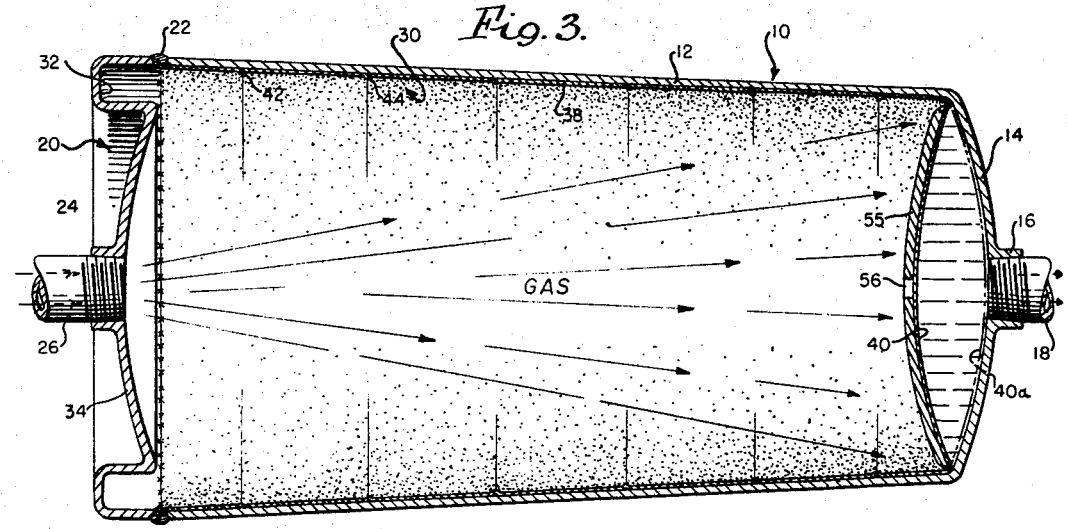

United States Patent Office 3,494,513
Patented Feb. 10, 1970

3,494,513
POSITIVE EXPULSION TANK
William H. Bauer, Grand Island, N.Y., assignor to Bell
Aerospace Corporation, Wheatfield, N.Y.
Filed Aug. 11, 1966, Ser. No. 571,938
Int. Cl. B67d 5/40
U.S. Cl. 222—386.5                                   4 Claims

ABSTRACT OF THE DISCLOSURE

The ductile metal bladder of a positive expulsion tank is folded in accordion fashion to present a series of concentric annular bands, the innermost of which is provided with a head wall at one end so that pressurizing fluid subjects the innermost band to hoop tension rather than hoop compression whereby the rolling-unfolding action imparted to the bladder during the positive expulsion process does not give rise to buckling tendencies.

---

This invention relates to spacecraft propellant tanks or the like, and more particularly to such tanks embodying displacement means therein for expulsion of the tank contents when needed. Specifically, the invention relates to a positive expulsion liquid storage package for use in liquid rocket fuel-oxidizer prepackaged missiles, such as required to be operable under zero gravity conditions.

In spacecraft the fluid propellants are conventionally stored in tanks provided with internal bladders or diaphragms against which pressured gas is applied to expand and displace the bladders, thereby expelling the propellants from the tanks.

Basically it is a problem to provide such systems so that substantially the entire interior of the tank may be occupied with propellant and that substantially all of the stored fuel may be expelled therefrom for its intended use, regardless of attitude in space and/or gravity effects thereon; and also that the pressured bladder parts be chemically compatible with the gas and liquid materials coming in contact therewith.

It is a primary object of the present invention to provide an improved propellant storage tank and expulsion system in conjunction therewith whereby to overcome the hereinabove stated problems.

Another, more specific object of the invention is to provide an improved system as aforesaid having a volumetric efficiency of the order of 95% and an expulsion efficiency in excess of 98%.

Another object is to provide an improved bladder construction in a device as aforesaid.

Still another object is to provide an improved system as aforesaid wherein no plastic yielding of the bladder material is requisite to substantially 100% expulsion efficiency.

Another object is to provide an improved combination storage and expulsion package as aforesaid, which is lightweight and which provides a predictable center of gravity shift pattern.

Figure 1:
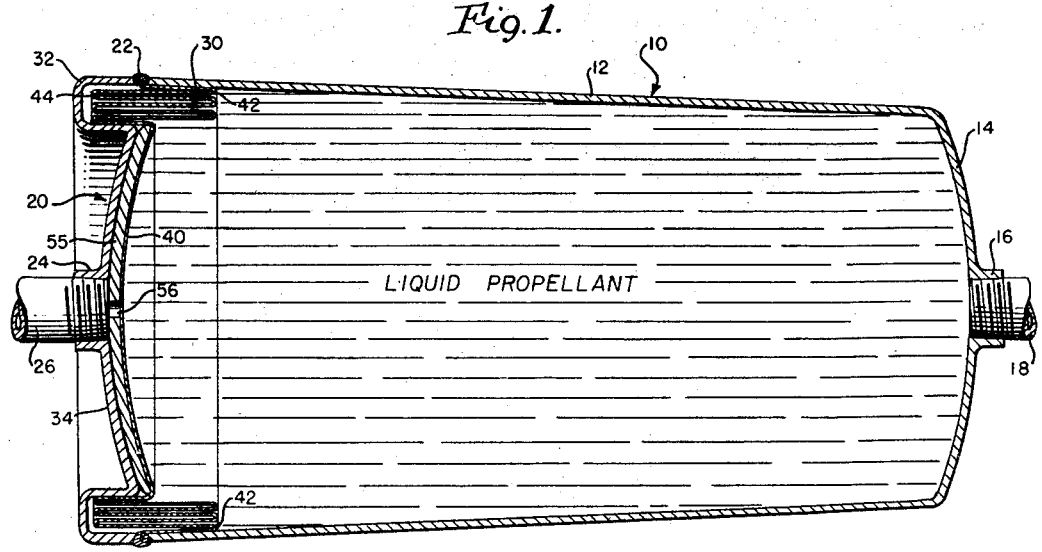
Figure 2:
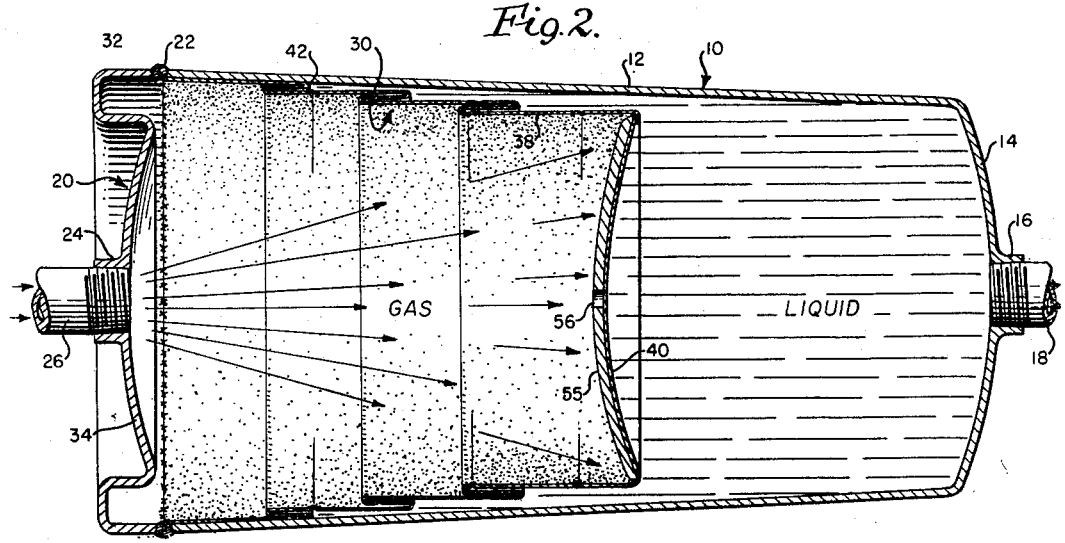

Other objects and advantages of the invention will appear from the following specification and the accompanying drawing wherein:

FIG. 1 is a longitudinal sectional view of a positive expulsion tank of the invention; showing the tank in liquid-filled condition;

FIGS. 2, 3, correspond to FIG. 1 but illustrate the system in partially and completely emptied conditions, respectively; and FIG. 4 is an enlarged scale, detail view, of a portion of FIG. 1.

As illustrated herein by way of example, the liquid storage and positive expulsion package of the invention may comprise a generally cylindrically shaped tank 10 having a rigid cylindrical wall section 12 closed at one end by a bell-shaped end wall 14 which is fitted with a liquid outlet portal 16 into which a delivery conduit 18 is connected. At its other end the tank 10 is closed by means of an end cover wall 20 which is welded to the cylinder wall 12 as indicated at 22 as will be explained hereinafter. The end bell 20 is formed with a gas inlet portal 24 to which connects a pressured gas supply conduit 26.

The tank 10 is provided interiorly thereof with a special rolling-telescopic type bladder as indicated generally at 30, which is formed of sheet metal or the like as will also be more fully expained in detail hereinafter. When in extended form the device is of a closed-end cup-shaped configuration dimensioned so as to fit into and closely conform to the inner cylindrical wall and discharge end wall portions of the tank. Thus, as illustrated at FIG. 3, when the open end lip portion of the bladder 30 is fixed to the intake end of the tank wall structure and the bladder is extended, it comprises a lining device closely hugging the interior of the tank. The end wall member 20 of the tank structure includes a perimetrically located annular recess portion as indicated at 32, surrounding the dish-shaped main body portion 34 thereof. The recess 32 accommodates in nested relation therein the bulk of the bladder structure when the latter is compacted into inoperative position as shown in FIGS. 1 and 4, as will also be explained more fully hereinafter.

The bladder 30 may be fabricated by the impact extrusion process, explosive forming or other well-known methods of seamless construction thus forming the walls 38 and the head piece 40 of one piece. The head portion 40 is then pressed through the center of the cylindrical wall portion 38 until the traveling perimetric fold line between the pressed-in portion and the cylindrical wall portion 38 arrives at a position such as indicated at 42, FIGS. 1, 4. The press operation is then reversed whereby the closed end section 40 of the bladder is again pushed through the center thereof but in opposite direction, until such time as the newly formed traveling fold line reaches a position such as is indicated at 44 (FIGS. 1,4). Thus, an accordion-pleated appearing (in section) folding of the cylindrical wall portion of the bladder is initiated; and this operation is repeated until such time as all of the side wall material of the bladder is compactly pleated as shown in FIGS. 1 and 4. The material of the bladder structure will of course be appropriately annealed from time to time as the operation indicates the need.

To assemble the device of the invention the bladder 30 is first prepared in fully pleated form as explained hereinabove and is then slip-fitted into the open end of the tank 10 prior to welding of the end cover 20 thereon. It is preferred to "spin" the extreme lip portion of the bladder device into an outwardly flared configuration as best illustrated at 52 (FIG. 4) whereby the bladder device is precisely positioned incidental to assembly relative to the tank structure. Also, it will be appreciated that when the end cover 20 is then moved into position for welding to the tank cylinder wall 12, the end lip 52 of the bladder will be sandwiched therebetween to become incorporated in the weldment 22 which thereupon interconnects the parts in fluid-tight pressure-resistant relation. Prior to such assembly of the end cover 20 on the tank a substantially rigid dish-shaped head member 55 is set loosely in place against the central inside surface of the cover member 20 between the bladder and the cover 20.

The head member 55 is centrally apertured as indicated at 56.

Therefore it will be appreciated that, assuming the system to be fully loaded with liquid propellant as illustrated at FIGS. 1, 4, upon inlet of pressured gas through the conduit 26 (under remote or standby pilot control) the gas will thereupon be applied primarily against the movable head 55 and secondarily against the flat body portion 40 of the bladder device; thus driving this portion of the assembly to displace inwardly of the tank structure to expel liquid propellant therefrom through the outlet conduit 18. FIGS. 2, 3, illustrate how the liquid expulsion operation progresses. As shown in FIG. 2 for example, the package is illustrated as being substantially half-emptied; the movable head 55 and end wall portion 40 of the bladder having been displaced by the gas pressure to the position shown. It is to be noted that incidental to such transposition of the movable head 55 the latter operates to maintain the configurational integrity of the bladder device while causing the cylindrical side wall portion thereof to progressively unfold as shown in FIG. 2.

FIG. 3 illustrates how the bladder 30 further extends and readily conforms to the inner configuration of the container 10 as the movable head member 55 arrives at the discharge end of the container. As the latter abuts against the end portion 14 of the container its progress is halted, but the compressed gas supplied by conduit 26 operates through the aperture 56 in the head member to thereupon press against the end body portion 40 of the bladder device. Thus, it is driven to move further forwardly into abutting contact against the end wall 14 of the container as indicated at 40a (FIG. 3); thereby completing the expulsion of the liquid from the tank 10 through the orifice 16. Therefore, whereas substantially the entire volumetric capacity of the tank internal configuration has been initially occupied by liquid propellant as shown in FIG. 1, the liquid has been completely expelled therefrom as shown in FIG. 3.

It is a particular feature of the invention that the expulsion operation has required no plastic deformations of parts of the bladder structure, but has been accomplished simply by telescopic unfolding of the pre-pleated bladder strucutre. To facilitate the substantially 100% expulsion efficiency aspect of the system the tank wall 12 may be formed to a slightly conical configuration as shown in the drawing herewith, in lieu of a strictly cylindrical wall form. Thus, as is evident from the drawing herewith, the bladder 30 may more readily and easily conform to the inner wall configuration of the container.

The bladder device 30 of the invention may be formed of any preferred flexible material. For example, in connection with the storage and expulsion of a supply of nitrous oxide ($N_2O_4$) for missile propelling and/or guidance purposes, the bladder may be formed of a soft aluminum alloy sheet material; the latter being chemically compatible with such liquids to such degree as to render completely practicable the pre-packaging or storage of such liquids in a device as aforesaid for periods up to ten years or so. A bladder fabricated of metal as aforesaid remains forever impervious to leakage and is lightweight, and therefore provides many advantages over bladder structures of the prior art.

Hence it will be appreciated that the system of the invention involves the use of no undesirably pervious plastic bladder materials or adhesive type connection devices or the like. It provides a superior self-shaping (non-buckling) bladder espansion system which conforms with utmost ease and facility to the inner configuration of the liquid container; thereby providing for substantially complete expulsion of the container contents. Also, although only one form of the invention has been illustrated and described in detail hereinabove, it will be understood that various changes may be made therein without departing from the spirit of the invention or the scope of the following claims.

I claim:
1. A fluid storage and expulsion system comprising:
a rigid container of generally cylindrical wall form closed at opposite ends by dish-shaped end walls thereby forming annular corner portions at opposite ends of said containers,
said end walls being formed respectively with a pressured-gas inlet port and a fluid outlet port,
said gas inlet port being adapted for connection to a source of pressurized gas and said fluid outlet port being adapted for connection to a fluid delivery device,
a rigid dish-shaped head member complementary to and set against the inner surface of said inlet end wall of said container in freely movable relation thereto,
a bag-shaped bladder formed of flexible sheet material disposed within said container and comprising a cylindrical wall portion and an end wall portion closing one end of the cylindrical wall portion thereof,
said cylindrical wall portion terminating at its open end in a marginal lip portion,
said bladder being telescopically rolled into side wall pleated form and thus compacted within the inlet end of said container with the end wall portion of said bladder disposed against said movable head member and the pleated wall portion thereof compacted into the annular corner portion of said container,
said bladder lip portion being fixed to said container in fluid-pressure-tight relation,
whereby fluid may be stored in said container in sealed relation against said bladder and the cylindrical wall and outlet end wall portions of said container and whereby said fluid may be expelled therefrom by opening the outlet connection and introducing gas pressure through said gas inlet port, thereby forcing said movable head to displace progressively through the length of said container while carrying with it the end wall portion of said bladder and progressively unrolling the cylindrical wall portion of said bladder,
said end walls of said container being outwardly convex and said movable head member being shaped to complement the concave inner surface form of the inlet end wall, and said movable head member being apertured; whereby upon ultimate displacement of said movable head member into abutting relation with the outlet end wall portion of said container the gas pressure behind the end wall portion of said bladder will displace the latter still further and away from said movable head member and against the outlet end wall of said container.

2. A system as set forth in claim 1 wherein the inner configuration of said container cylindrical wall portion tapers from the inlet end thereof to a smaller diameter at the outlet end thereof, and wherein said bladder is shaped when in extended condition to closely complement the inner configuration of said container without plastic deformation of the bladder material.

3. A positive expulsion tank assembly comprising, in combination,
a cylindrical container for housing fluid to be expelled, said container having opposite end walls, one of which is provided with a pressurizing fluid inlet and the other of which is provided with an outlet for the fluid to be expelled,
a ductile metal bladder received in said container having a cylindrical side wall open at one end and closed at its other end by a head portion, said open end of the bladder being sealingly joined to said container adjacent said one end wall thereof and the side wall of said bladder being accordion folded in cross section to present a series of concentric annular bands successively joined by fold portions, the fold portion of the innermost band being disposed closer to said one end wall than is the next successive following fold portion, whereby the pressurizing fluid exerts and maintains hoop tension on said inner band.

4. The assembly as defined in claim 3 wherein said head portion is dished toward said one end wall of the container.

References Cited

UNITED STATES PATENTS

| 2,505,798 | 5/1950 | Skinner | 60—259 |
| 3,140,802 | 7/1964 | Everett | 222—386.5 |
| 3,275,193 | 9/1966 | Barr | 222—386.5 |
| 3,296,803 | 1/1967 | Kroekel | 222—389 |

SAMUEL FEINBERG, Primary Examiner

U.S. Cl. X.R.

60—39.48